(12) United States Patent
Incavo et al.

(10) Patent No.: US 6,401,524 B1
(45) Date of Patent: Jun. 11, 2002

(54) METHOD OF DETECTING STEAM EXPANSION VESSEL LEAKAGE

(75) Inventors: Joseph Alan Incavo, Uniontown; William Randall Dutt, Copley, both of OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/732,689

(22) Filed: Dec. 8, 2000

(51) Int. Cl.⁷ .......................... B29C 35/04; G01M 3/26; B29H 5/02
(52) U.S. Cl. ................... 73/40; 73/40.7; 73/49
(58) Field of Search .................. 73/40, 40.7, 49.2–49, 73/45.6

(56) References Cited

U.S. PATENT DOCUMENTS

| | | | | |
|---|---|---|---|---|
| 3,320,969 A | * | 5/1967 | Gordon | 137/312 |
| 3,444,725 A | * | 5/1969 | Chave | 73/40.7 |
| 3,888,111 A | * | 6/1975 | Craig | 73/40.7 |
| 3,914,983 A | * | 10/1975 | Umezu | 73/40.7 |
| 3,942,922 A | * | 3/1976 | Cole et al. | 425/30 |
| 4,188,818 A | * | 2/1980 | Garrison | 73/40.7 |
| 4,199,975 A | * | 4/1980 | Schrock et al. | 73/40.7 |
| 4,221,124 A | * | 9/1980 | Jones | 73/40 |
| 4,226,113 A | * | 10/1980 | Pelletier et al. | 73/40.7 |
| 4,524,607 A | * | 6/1985 | Pelletier et al. | 73/40.5 R |
| 5,168,747 A | * | 12/1992 | Weaver et al. | 73/40.7 |
| 5,365,772 A | * | 11/1994 | Ueda et al. | 73/40.7 |
| 5,417,900 A | * | 5/1995 | Martin, Sr. et al. | 264/40.5 |
| 5,663,489 A | * | 9/1997 | Thungstrom et al. | 73/40.7 |
| 5,687,606 A | * | 11/1997 | Reilly | 73/73 |
| 5,767,390 A | * | 6/1998 | Chapman, IV | 73/40.7 |
| 6,014,892 A | * | 1/2000 | Beret et al. | 73/40.7 |

* cited by examiner

*Primary Examiner*—Hezron Williams
*Assistant Examiner*—David J. Wiggins
(74) *Attorney, Agent, or Firm*—David E Wheeler (57) ABSTRACT

Leaks in a steam expansion vessel, such as a flexible curing bladder, may be detected during a high temperature curing cycle by using a humidity sensor in an article curing and leak checking apparatus. The effectiveness of the humidity sensor may be enhanced by selecting or creating a path in the apparatus incorporating the humidity sensor for detecting a leakage of steam, which tends to direct escaping steam to the humidity sensor in a substantially concentrated flow. The humidity sensor may be encased in a portion of the apparatus.

20 Claims, 4 Drawing Sheets

METHOD OF DETECTING STEAM EXPANSION VESSEL LEAKAGE

TECHNICAL FIELD

This invention relates to a method for inspecting for evidence of leakage of a steam expansion vessel, and more particularly, to a method for inspecting for evidence of a pinhole leak in a steam expansion vessel.

BACKGROUND ART

Steam expansion vessels may be used in industry to activate equipment, and may have application for a variety of purposes.

Many curing devices for molded products use an expansion vessel, also known as a curing bladder. In a curing device, most expansion vessels are pressurized with a fluid heat source, such as steam. The steam causes the expansion vessel to expand, pushing the product tightly against the mold. Further, the heat from the steam helps to at least partially cure the molded product.

Problems occur when a defect, such as a pinhole leak, forms in the expansion vessel. In the tire industry, pinhole leaks in expansion vessels on curing devices are one of the industry's largest causes of tire scrap. Pinhole leaks in expansion vessels cost tire manufacturers millions of dollars per year. A pinhole leak allows high temperature steam to contact the innerliner of the tire. One possible result of this contact is an undercured area in the innerliner. Another possible result is the permeation of steam into the ply area of the tire, causing a blister that can result in the separation of the plies. Currently, the first inspection of a tire for the effects of pinhole leaks occurs in the final finish area of the tire plant, minutes after the tire leaves the curing device. If a tire in final finish is found to be defective as a result of a pinhole leak, then up to ten additional tires may have been cured with the same defective expansion vessel prior to discovery of the problem. Generally, all of these tires must be scrapped.

In order to reduce scrap caused by defective expansion vessels, expansion vessels are changed after a set number of cycles. This preventative measure does not always prevent scrap, however, because a pinhole leak may develop prior to this set number of cycles. Additionally, this preventive measure may change out some expansion vessels that still have many more cycles in their effective life. Thus, scrap tires may still result, money is lost by not utilizing the full life of the expansion vessel, and additional labor costs arise due to more frequent expansion vessel changes.

This has been a continuing problem in the tire industry since bladder curing was introduced in the 1960's. The industry has made many attempts to solve this problem with varying degrees of effectiveness.

Cole et al. in U.S. Pat. No. 3,942,922 teach an apparatus for curing a tire having an internal cavity, using steam as a heat and fluid pressure media. The time rate of pressure loss in the cavity is determined in each tire curing cycle by closing the cavity to form a completely closed chamber for a test time less than the normal cure time for a tire. Pressure loss during the test time is monitored and if determined to be greater than normal, a warning device is actuated and means for loading the next tire into the mold is rendered inactive.

Garrison, in U.S. Pat. No. 4,188,818 teaches a self-contained device for selectively discharging a pressurized gas within a hermetically sealed vessel to enable leak testing of the vessel. A linear actuator is used to open a small, high pressure cylinder that is charged with a detector gas. The mechanism is mounted on the interior of a lid that is sealed onto the vessel which is to be tested.

Jones, in U.S. Pat. No. 4,221,124 teaches a low-level flow sensor for detecting bladder leaks and ruptures. A dual mode logic circuit is used to monitor for bladder leaks where there are low level failures during a preselected portion of a curing cycle, and at other times requires sustained flow to the sensor for a predetermined time to indicate bladder ruptures or high-level failures. A warning signal is generated and the cycle is interrupted to prevent loading of a next tire into a curing press if a leak is detected.

Curing device manufacturers have attempted to limit scrap products caused by pinhole leaks in expansion vessels by incorporating a monitoring system into the curing device. Before a product to be cured is placed into the curing device, the expansion vessel of the curing device is pressurized. The pressurized expansion vessel is isolated by closing the valves in the supply and discharge lines. The monitoring system monitors the pressure in the expansion vessel to determine if a leak is present.

U.S. Pat. 5,417,900 entitled "Vacuum Leak Detector for a Tire Curing Press" discloses a device and a method for detecting a leak in an inflatable elastomeric bladder of a curing press. The spent curing fluid is pumped through an exhaust line in which a venturi ejector is located. The venturi ejector causes a vacuum to be created as the fluid is being removed. A vacuum sensor monitors this vacuum. If a predetermined vacuum strength is not reached in a predetermined time, a leak is assumed to exist.

These prior art systems work well when a leak occurs at the coupling attaching the expansion vessel to the curing device. However, these systems are not adequate for detecting a pinhole leak in an expansion vessel. Since the quantity of fluid lost through a pinhole leak is small, relative to a coupling leak, determining the presence of such a leak using pressure and/or vacuum sensors is very difficult. These devices also signal leaks in bladder seals.

The present inventors have long searched for an effective solution to the problem of detecting leaks in a steam expansion vessel. In the past, detection methods that were tried included sensing the mass flow of nitrogen from the mold; the addition of dye to cure steam and the use of a UV sensor or a color sensor to detect the escape of the dye; the use of tracer gases inserted into a bladder, and the use of gas sensors to detect the tracer gases; the use of infrared thermal sensors; and testing for relative humidity around the mold.

While all these methods theoretically could be used, it was found in application that each method had some practical limitations. In testing for relative humidity, for example, it was found that at high temperatures "relative humidity" has less meaning since water vapor does not condense easily, and the dew point is so high that normal means for testing for relative humidity are not applicable.

SUMMARY OF THE INVENTION

A method for detecting leaks in a steam activated expansion vessel is used in industrial equipment, and comprises the steps of creating or selecting a path in industrial equipment through which steam would travel if escaping from a steam activated expansion vessel, and placing a humidity sensor in the path.

The method of detecting leaks comprises the further step of selecting a humidity sensor that has the ability to detect moisture at 25° C. to 200° C., and comprises the step of using data from each activation cycle to establish an average or baseline for humidity of a plurality of activation cycles, and comprises the further step of providing computer control for the industrial equipment, such that when a leak is detected an alarm is sounded and the industrial equipment is automatically shut down.

A further step is provided of placing a filter in the path between the activated expansion vessel and the sensor, the filter being pervious to water vapor.

In the illustrated embodiment, the industrial equipment is a curing mold for a pneumatic tire, and the path includes a bolster screw in an area of the mold in the proximity of a bead area of a tire which is being cured in the mold, and the method comprises the further step of placing the humidity sensor in the bolster screw. The curing bladder is substantially centered on the tire being cured, and the bolster screw is in the proximity of a curing bladder center post.

In an alternative embodiment, a conduit can be run from the bolster screw to a position remote from the mold, and the humidity sensor can be placed at the end of the conduit.

The mold in the illustrated embodiment is a two piece mold, and the method may comprise the further step of placing the sensor in or around an upper portion of the mold.

An apparatus for curing an article comprises a shaping means for shaping the article during curing, an expansion vessel within the shaping means, the expansion vessel having the capacity to withstand elevated temperatures and high pressures. In the operation of the apparatus, the expansion vessel is inflated with steam and used to push the article into the shaping means, and an absolute humidity sensor is located in the proximity of the expansion vessel and the shaping means, in a path selected to detect leaking steam from the expansion vessel.

The apparatus for curing an article comprises a curing mold for a pneumatic tire, and an absolute humidity sensor which has the ability to detect moisture at 25° C. to 200° C. In the illustrated embodiment, the apparatus comprises a two-piece tire mold. The apparatus further comprises a magnet attached to the curing mold, the absolute humidity sensor being attached to the magnet, whereby the absolute humidity sensor is held in place by the magnet.

Definitions

For ease of understanding this disclosure, the following terms are defined.

"Bead" means that part of the tire comprising an annular tensile member wrapped by ply cords and shaped, with or without other reinforcement elements such as flippers, chippers, apexes, toe guards, and chafers, to fit a design rim. The beads are associated with holding the tire to the wheel rim.

"Curing" means the process of heating or otherwise treating a rubber or plastic compound to convert it from a thermoplastic or fluid material into a solid, relatively heat-resistant state by causing cross-linking of the compound.

"Elastomer" means a resilient material capable of recovering size and shape after deformation.

"Elastomeric article" is an article that is at least partially made from an elastomer.

"Innerliner" means the layer or layers of elastomer or other material that form the inside surface of a tubeless tire and that contain the inflating fluid within the tire.

"Pneumatic tire" means a laminated mechanical device of generally toroidal shape, usually an open torus, having beads and a tread and made of rubber, chemicals, fabric and steel or other materials. When mounted on the wheel of a motor vehicle, the tire, through its tread, provides traction and contains the fluid that sustains the vehicle load.

"Radial" and "radially" are used to mean directions toward or away from the axis of rotation of the tire.

DETAILED DESCRIPTION OF THE INVENTION

For ease of description, the present invention will be described as it relates to tire curing equipment. Those skilled in the art will recognize that the invention may be used in other types of curing equipment using a steam expansion vessel, and other types of equipment where a steam expansion vessel can be used.

In the development of the present invention, it was found that relative humidity sensors do not work in the invention in or near the mold, because the dew point of escaping steam is so high at the temperatures used, that data does not register on a relative humidity sensor. Since the temperatures used for curing tires are normally in the range of 140° C. to 180° C., in order to test for leaks in a curing bladder by measuring steam loss, it was believed that it was necessary to find a sensor that is capable of detecting water vapor at 100° C. to 200° C., and not be destroyed by the high temperatures involved.

After evaluating a number of testing methods for finding a leak in a curing bladder, the inventors tried an absolute humidity sensor, which is used in industry in food processing, autoclaves, steam injection ovens, industrial dryers, clothing dryers, catalyst production, and desiccant heat recovery. The sensor used in the illustrated embodiment was provided by Ohmic Instruments Company, Easton, Md. The ABS-300 sensor has two matched thermistor elements, one being hermetically glass encapsulated in dry nitrogen, and the other exposed to the environment. Air containing water vapor exhibits a thermal conductivity higher than dry nitrogen, and the difference in heat dissipation between the two thermistors creates a temperature differential that is exhibited as an electrical potential difference. The sensor has been found to be particularly suitable for measuring absolute humidity at 100° C. to 200° C., covering the temperature range used in curing tires, and can be used at 25° C. to 200° C.

Figure 1:
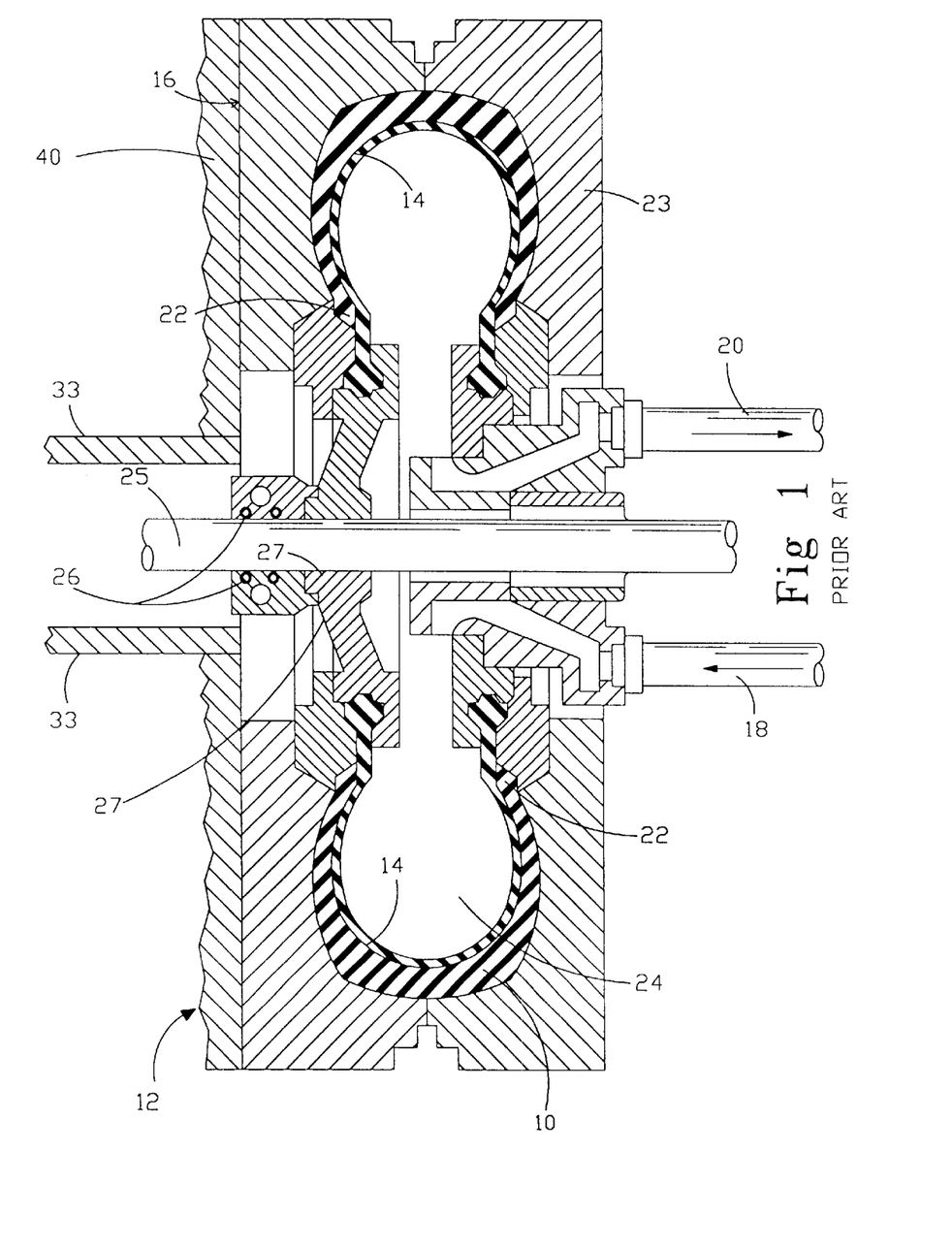
FIG. 1 is a view of an elastomeric article in a prior art curing device with an expansion vessel.

FIG. 1 illustrates an elastomeric article, in this instance a tire 10, in a prior art curing device 12. The curing device 12 has an expansion vessel 14 that inflates when a pressurized fluid is introduced into its interior. FIG. 1 shows the expansion vessel in its inflated form, confined in a tire mold 16. In a typical curing device 12, the inflated expansion vessel 14 forces the elastomeric article tightly against mold 16. While the pressurized expansion vessel 14 holds the elastomeric article against the mold 16, the elastomeric article is shaped by the mold and is heated to cause curing. The heat may be introduced via the mold 16 or via the pressurized fluid. Typically, steam is used as both a pressurized fluid and a heat source for at least a portion of the cure time.

The mold 16 illustrated in FIG. 1 is a two piece mold that separates for the removal of a cured elastomeric article, and insertion of an uncured elastomeric article. The pressurized fluid is introduced into the expansion vessel 14 through an inlet channel 18, and exits through an exit channel 20. The inlet channel 18 and the exit channel 20 contain valves which work together to regulate the pressure within the expansion vessel 14.

In the curing of a tire 10, an uncured tire 10 is placed into a curing device 12 having an expansion vessel 14. The uninflated expansion vessel 14 is located radially inwardly of the beads 22 of the tire 10. After the mold 16 is closed, steam is introduced into the expansion vessel 14 and the expansion vessel 14 inflates. As the expansion vessel 14 inflates, at least a portion of it enters into a cavity 24 in the tire 10. Ideally, the expansion vessel 14 will occupy the entire cavity 24 and contact the surface within the cavity 24, pushing the tire 10 against the mold 16. Generally, the surface within the cavity 24 that is contacted by the expansion vessel 14 is the innerliner of the tire 10. The pressurized fluid is contained within the expansion vessel 14 for a predetermined period of time so that the tire 10 may at least partially cure. In most instances, the heat source is removed prior to deflating the expansion vessel 14. The steam, which acts as the heat source and the pressurized fluid, is slowly released out of the expansion vessel 14 and is replaced by another pressurized fluid, such as nitrogen. After a predetermined time has elapsed, the pressurized fluid is released from the expansion vessel 14 into the exit channel 20. As a result, the expansion vessel 14 is deflated and is withdrawn from the cavity 24. Finally, the mold 16 is opened and the at least partially cured tire 10 is removed from the curing device.

Figure 2:
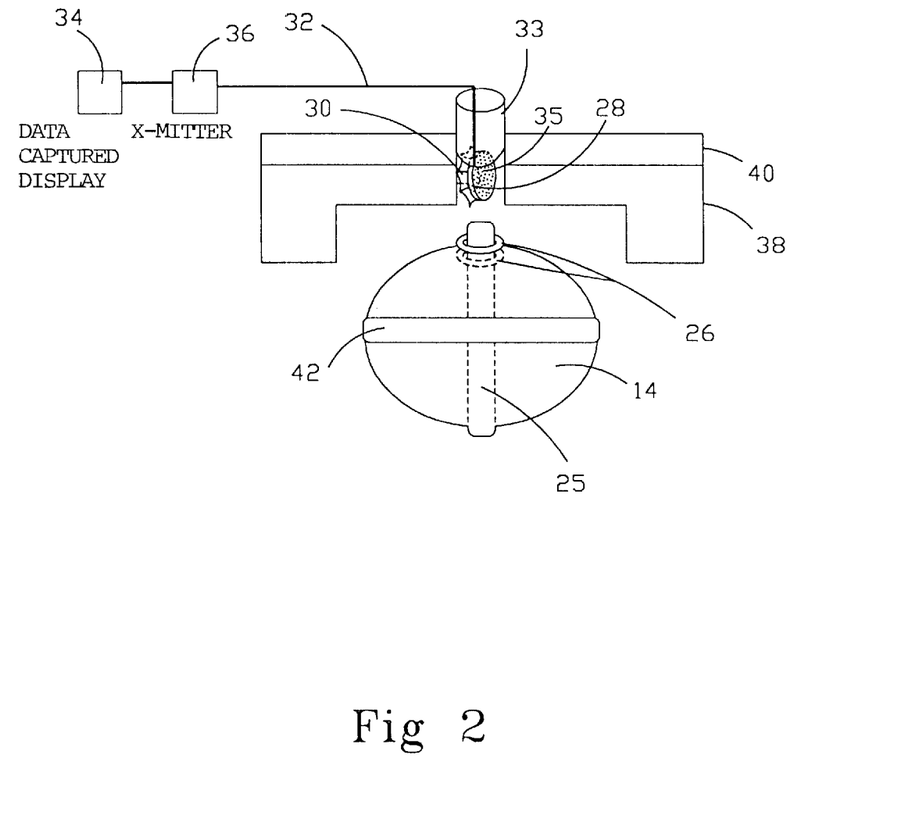
FIG. 2 is a view of a schematic of modifications of the invention in a curing device according to FIG. 1.

With reference to FIGS. 1 and 2, in the method of the invention, an absolute humidity sensor 28 is placed in a bolster screw 33 of a prior art curing device 12, in the illustrated embodiment a two-piece mold, near the center post 25 which raises and lowers expansion vessel 14 when the mold 16 is used to cure a tire.

Center post 25 passes through the middle of expansion vessel 14, which, in the illustrated embodiment, is an elastomer/fabric composite bag. The top, open end of the composite bag is gathered by top ring 27, which fits over center post 25.

The mold 16 operates by inserting a tire, which is to be cured into the mold when the expansion vessel 14 is deflated, and the center post 25 is retracted toward the lower portion of the mold. When a tire has been placed into the mold, the upper portion 38 of the mold is pressed down over the lower mold portion 23, and the mold is activated by inflating the expansion vessel 14 with steam, and pushing center post 25 toward bolster screw 33. O-rings 26, located in top ring 27, seal the expansion vessel 14 against center post 25 to prevent the escape of steam at center post 25. Platen 40 is used to apply pressure to the top of the mold, to hold the two mold portions together while the tire is subjected to high pressure, which pushes the tire into the mold, creating a molded pattern on the cured product.

The center post retracts and extends the top portion of the curing bladder, i.e. the portion of the curing bladder in the top half of the mold, a substantial distance as compared to the movement of the curing bladder in the bottom half of the mold, each time a tire is cured. It is speculated that it is because of the substantial amount of flexing of the top portion of the bladder, as compared to the bottom portion of the bladder, that most defects developed from the use of a curing bladder are found to appear in the top portion of the bladder. Also, hot air and steam tend to rise, and accordingly, it is preferred to locate the absolute humidity sensor in the top half of the mold.

Those skilled in the art will recognize, however, that a curing bladder, in operation, contains high pressure steam, and a steam leak at high pressure will force steam into many paths around the curing bladder, and suitable paths for placement of a sensor may be found in the lower half of the mold.

The inventors have also carried out trials using segmented tire curing molds with disappointing results. The inventors speculate that there are too many restrictions in the potential paths for steam in the more complicated segmented molds, and that the steam escaping from punctured curing bladders in a segmented curing mold is not able to find its way to a similarly placed absolute humidity sensor. It is the inventors' belief however, that knowledge of the nature of the path in the two piece mold can be applied to design a path for the segmented curing mold, and the segmented mold can be modified to provide a path for steam escaping from leaking curing bladders.

Figure 3:
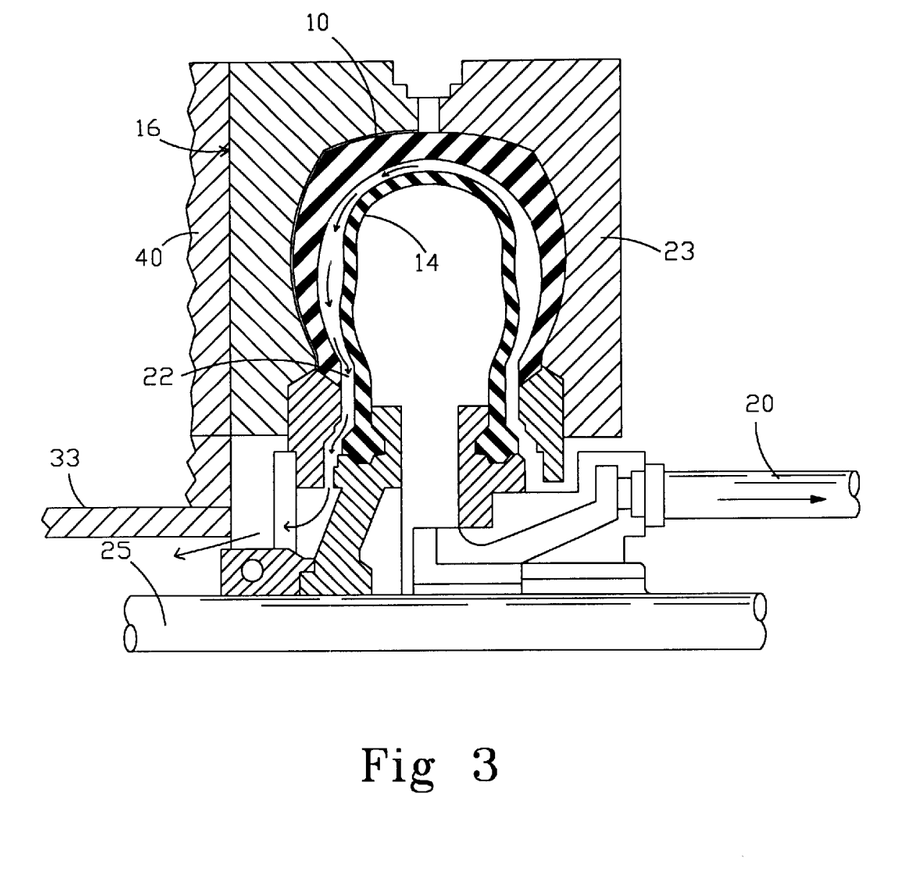
FIG. 3 is a representation of a tire and curing bladder in a two-piece mold.

With reference now to FIG. 3, in the illustrated embodiment of the two piece curing mold, sensor 28 is located in bolster screw 33. This location was chosen since it is proximal to the bead area of a tire, which is being cured. There is a natural path in the mold from the bead area of the tire to bolster screw 33 when the mold is closing or being opened. Thus, when there is a hole in expansion vessel 14, steam that escapes from expansion vessel 14 will make its way along the path in the mold toward bolster screw 33, and will pass by sensor 28.

Bolster screw 33 is used, as its main function, to adjust the height of the mold press for curing different sized tires. In choosing this location for placement of absolute humidity sensor 28, the inventors theorized that the tire 10 would act as a barrier against any steam that leaks from expansion vessel 14 preventing its dissipation in the mold, and forcing the steam to follow a path out of the tire cavity 24 toward bead 15. Bead 15 is adjacent to post 25 and in the proximity of bolster screw 33, and bolster screw 33 is hollow and open to the atmosphere, providing a natural escape path for the steam.

Although the steam pressure inside the curing bladder may be 200 to 300 psig (pounds per square inch gauge), most bladder defects appear as pin-hole sized cracks or holes, and the total steam lost in a curing cycle may be only 5 cc (cubic centimeters) to 10 cc. Once exposed to the atmosphere, the expansion of the steam causes the steam to cool, and the water molecules in the steam rapidly equilibrate to atmospheric pressure. Bolster screw 33, in effect, acts like a chimney for the venting of expanding and cooling water vapor.

Since the amount of escaping steam is so small, and because the flow variation of gases in a mold may vary by much more than 10 cc on consecutive cures of tires of the same size, it was anticipated that it would be difficult to find detectable differences between atmospheric moisture and the moisture escaping from curing bladder 23. It is believed, however, that preventing dissipation of the steam by the barrier provided by the tire 10 in the mold, the narrow flow path between bead 15 and post 25, and the relatively narrow opening in bolster screw 33, provides a concentrated flow of escaping steam over absolute humidity sensor 28. Also, it is believed that a relatively high temperature in the proximity of the mold reduces the atmospheric humidity around absolute humidity sensor 28, which enhances the differences in sensor response seen during a cure accomplished without a bladder leak, and a cure where a leaking bladder is used.

Those skilled in the art will recognize that apparatus using a steam expansion vessel can be modified to create a path in the apparatus for steam escaping from the expansion vessel. The absolute humidity sensor can then be placed in the path to detect escaping steam.

For example, if not already provided by the product in the mold, a barrier, such as a rubber bladder, can be included in the mold to prevent dissipation of escaping steam, a hole can be drilled in the mold in a location defined by an edge or terminal point of the barrier, and an absolute humidity sensor can be placed in the hole, where it is expected that a concentrated flow of water vapor would be present when there is a leak in the expansion vessel.

Other paths, and means of designing such paths will be apparent to those skilled in the art. For example, in the segmented molds discussed above, the inventors have contemplated using one of a number of bolt holes located in the ring that holds the curing bladder to the center post as a path for escaping steam.

Also, recognizing the importance of the path, the inventors anticipate that if a conduit is used to extend the path from the bolster screw to a point away from the mold, water vapor escaping through the mold can be cooled sufficiently, e.g., to about 25° C., such that a relative humidity sensor can be used to detect the escaping water vapor as well as an absolute humidity sensor. Thus, although earlier work indicated that a relative humidity sensor could not be used, with proper modifications of the path, it is believed that such a sensor will work.

Sensor 28 is connected by cable 32 to a data capture display 34 and transmitter 36, which are used to save and collate the data from the sensor and to transmit the data to the user. The absolute humidity sensor 28, as shown in FIG. 2, may be interconnected with the curing device 12, shown in FIG. 1, so that the curing device 12 can be stopped at the completion of a cycle in which escaped steam is discovered. Thus, if it is found that there is a greater amount of water vapor in the atmosphere of bolster screw 33 than is ordinary, the curing device 12 will be stopped. The apparatus used to stop the curing mold may be similar to that disclosed in U.S. Pat. No. 3,942,922, said patent being incorporated herein by reference.

A filter 35 may be placed in bolster screw 33 to separate escaping water vapor from gases, which may harm sensor 28. Filter 35 has a porosity of 2 to 12 microns, preferably about 6 microns, and in the illustrated embodiment is made of fiberglass. Those skilled in the art will recognize that other types of filters, such as Teflon™ filters can be used in practicing the invention.

Those skilled in the art will recognize that sensor 28 may be made of materials that may be inert to tire off-gases and other chemicals released in the mold, in which case a filter may not be necessary.

Table 1 and Table 2 in the examples show experimental data collected by following the method of the invention. For each experiment, pinhole leaks were deliberately created with 0.64 and 1.3 mm hypodermic needles near the mid-height of the expansion vessel 14. In each experiment, the elastomeric article was a P185/65R14 tire.

The sensor shows a significant change in response over background (normal cure) when a 0.64 mm hypodermic needle puncture is made in expansion vessel 14. The detection of such a leak was found to correlate with liner defects in cured tires. In this trial, leaks were detected prior to forming a scrap tire, thereby serving as an early detection system for such defects.

This invention allows for detection of a defect in an expansion vessel during each cycle of the curing device. The invention will limit the number of scrap products caused by a pinhole leak to one molded product per defective expansion vessel, and will allow each expansion vessel to be used until a defect occurs. Thus, this invention will reduce the number of scrap products and the costs associated with changing expansion vessels prior to the end of their effective life.

The invention is further illustrated with reference to the following examples.

EXAMPLE 1

In an experiment to test the applicability of a relative humidity sensor, applicants placed an I-2000 relative humidity sensor from Rotronic instrument corp. in a laboratory desiccating oven at a temperature of 180° C., and injected steam into the oven using a steam hose. Although it was expected, given the amount of steam that was injected, that the relative humidity sensor would provide a large response, the response actually seen was negligible.

EXAMPLE 2

In a field test, an absolute humidity sensor from Ohmic Instruments Company, designated ABS-300, was placed in the bolster screw of a two-piece mold for Integrity P185/65R14 tires. Single sensors were mounted on the left cavity and the right cavity in a curing mold where both curing bladders had undergone 472 cures.

Prior to testing in the mold, various tests were performed in the laboratory to evaluate sensor sensitivity, response time, recovery time, stability at 180° C., and transmitter stability at 70° C. The 0–10 volt output was calibrated to 0–130 g/m$^3$ water.

The sensor was screwed to a one-half inch magnet 30 (FIG. 2), slid inside the bolster adjusting screw, and attached to the inside wall of the adjusting screw approximately six inches above the top ring of the curing bladder (FIG. 2). The cable was routed out the top of the adjusting screw hole and across to the side of the press frame, where the transmitter was mounted. The same configuration was used for the adjacent mold cavity (each mold has two mold cavities, in this mold designated as No. 2009 and No. 2010), and the cables for the two sensors were bundled at the same spot on the press frame. In this example, the transmitter signals were sent to a Gould WindoGraf data capture and display unit. The unit and the power supply were connected to a power receptacle on an adjacent press.

In the first four attempts to test the response of the sensor, as illustrated in Table 1, there were large voltage responses registered by the sensor. It was found that steam was leaking around the o-rings on the centerpost, and the o-rings were replaced.

The o-rings 26 are located in the top ring of the expansion vessel 14, said ring being fixed around post 25, and the o-rings are designed to prevent leakage of steam from the bladder around post 25.

After the o-rings were replaced, again referring to Table 1, there was no voltage change registered by the sensor for the next six cures. Thereafter, a hypodermic needle, size 0.64 mm, was used to punch a hole in the bladder press cavity 2010. The needle puncture was made two inches above the centerline. On the next cure, press cavity 2010 showed a voltage change upon inflation of the curing bladder, although there was no defect found in the tire that was cured. On the next sequence involving press cavity 2010, the same results were seen.

Thereafter, the same hypodermic needle was used to punch a hole in the bladder in press cavity 2009. Apparently the hole re-sealed spontaneously since no voltage change was seen and no leak was detected, and the tire cured in the mold was not damaged. During the same cure cycle, a voltage was detected for the curing bladder in cavity 2010, which had been previously perforated with a needle, but the tire cured in 2010 only showed borderline defects. For the next cure, a larger 1.3 mm needle was used to poke a second hole in the bladder in press cavity 2009. The first hole made in the 2009 bladder was three inches below the centerline. The second, larger pinhole made in 2009 was made in the same spot as the initial puncture. When the curing sequence was carried out, a voltage change of 3.4 v was detected for 2009 on deflation, and the tire cured in the mold was found to be defective. On the same cycle, the tire cured in press cavity 2010 was also found to be defective.

TABLE 1

Test results from absolute humidity sensor trail - first day 9/19/00

| Cure run | Press cavity | Hole? | Hole size, mm | Hole location | Voltage change, inflation | Voltage change, deflation | Leaker defect? |
|---|---|---|---|---|---|---|---|
| 1 | 2009 | N | — | — | 6.2 | 0 | N |
|  | 2010 | N | — | — | 4.4 | 0 | N |
| 2 | 2009 | N | — | — | 7.1 | 0 | N |
|  | 2010 | N | — | — | 4.8 | 0 | N |
| Top o-rings changed on both 2009 and 2010 ||||||||
| 3 | 2009 | N | — | — | 0 | 0 | N |
|  | 2010 | N | — | — | 0 | 0 | N |
| 4 | 2009 | N | — | — | 0 | 0 | N |
|  | 2010 | N | — | — | 0 | 0 | N |
| 5 | 2009 | N | — | — | 0 | 0 | N |
|  | 2010 | N | — | — | 0 | 0 | N |
| Poked hole on left side = 2010 ||||||||
| 6 | 2009 | N | — | — | 0 | 0 | N |
|  | 2010 | Y | 0.64 | Upper | 3.5 | 0 | N |
| 7 | 2009 | N | — | — | 0 | 0 | N |
|  | 2010 | Y | 0.64 | Upper | 3.5 | 0 | N |
| Poked hole on right side = 2009 ||||||||
| 8 | 2009 | Y | 0.64 | Lower | 0 | 0 | N |
|  | 2010 | Y | 0.64 | Upper | 3.1 | 0 | Y |
| Poked larger hole on right side = 2009 ||||||||
| 9 | 2009 | Y | 1.3 | Lower | 0 | 3.4 | Y |
|  | 2010 | Y | 0.64 | Upper | 3.1 | 0 | Y |

Figure 4:
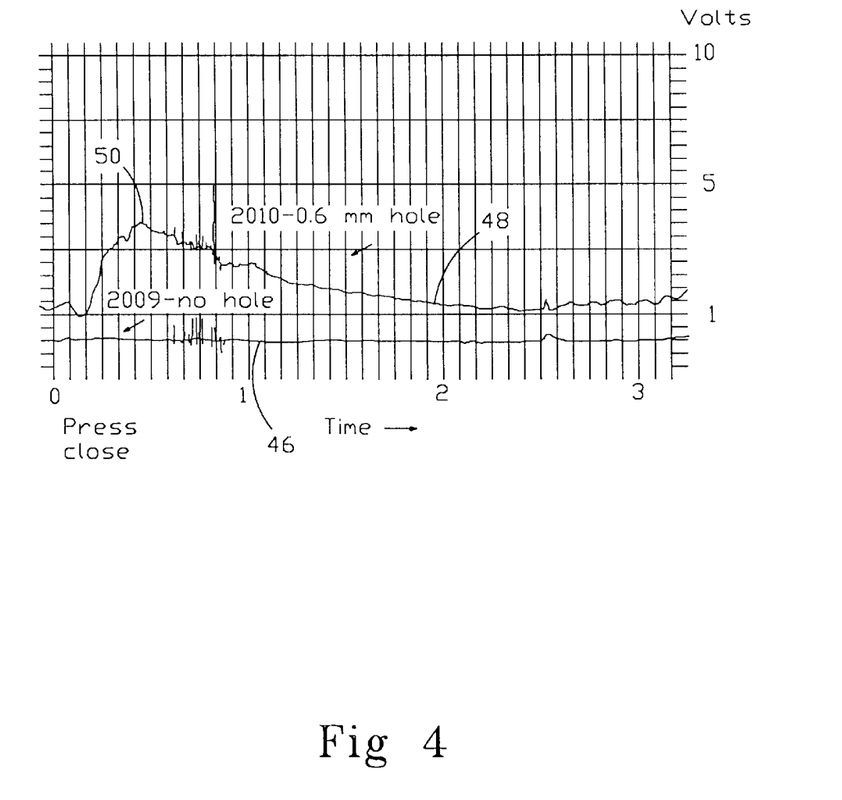
FIG. 4 is a graph of testing results using the apparatus of the invention.

With reference now to FIG. 4, the voltage response 46 of the sensor in a curing mold where the curing bladder has integrity, and there is no steam loss, is actually about 0.6 volts, whereas the voltage differential 50 for a bladder which has a 0.6 mm hole varies from about one volt when the press is first closed to about 3 volts when the steam is injected into the bladder (it is noted that the time coordinate is not to scale). The voltage 48 registered by the sensor gradually tapers off to about 1 volt just before the press is opened. This information can be used in an algorithm which is used to automatically stop the curing sequence when a bladder leak is detected.

EXAMPLE 3

Additional trials were carried out the following day. As shown in Table 2, a large number of cures were made without any voltage change detected either on inflation or deflation of the curing bladder. Even when tires were swabbed with a silicon release agent, which tends to release volatile chemicals into the mold, no voltage change was detected. After a number of cures, a hole was made in the expansion vessel in press cavity 2010 using a 1.3 mm diameter hypodermic needle, and a voltage change was immediately detected on the deflation cycle of the bladder. The tire cured in the mold on that cycle was found to have a leak-related defect.

TABLE 2

Test results from absolute humidity sensor trial - second day 9/20/00

| Cure run | Press cavity | Hole? | Hole size, mm | Hole Location | Voltage Change, Inflate | Voltage Change, Deflate | Leaker Defect? |
|---|---|---|---|---|---|---|---|
| 1 | 2009 | N | — | — | 0 | 0 | N |
|  | 2010 | N | — | — | 0 | 0 | N |
| 2 | 2009 | N | — | — | 0 | 0 | N |
|  | 2010 | N | — | — | 0 | 0 | N |
| 3 | 2009 | N | — | — | 0 | 0 | N |
|  | 2010 | N | — | — | 0 | 0 | N |
| Swabbed tires with silicone release agent ||||||||
| 4 | 2009 | N | — | — | 0 | 0 | N |
|  | 2010 | N | — | — | 0 | 0 | N |
| 5 | 2009 | N | — | — | 0 | 0 | N |
|  | 2010 | N | — | — | 0 | 0 | N |
| 6 | 2010 | N | — | — | 0 | 0 | N |
|  | 2009 | N | — | — | 0 | 0 | N |
| Poked hole on left side = 2010 ||||||||
| 7 | 2009 | N | — | — | 0 | 0 | N |
|  | 2010 | Y | 1.3 mm | Upper | 0 | 6.5 | Y |

CONCLUSIONS

The first experiment resulted in a bladder leak being detected two tires prior to forming a defective tire. It is realized, however, that needle punctures may be cleaner and less likely to produce tire defects than normal production defects.

It appears that the location of a hole or a crack relative to the grooves in the mold has a bearing on whether the hole can re-seal, or whether a free path away from the fracture is available on inflation or deflation.

It is speculated that when holes were made in the lower bladder region, a steam pocket was trapped, and released during deflation. The bladder has a smooth area 42 (FIG. 2) around the centerline that seals tightly to the tire liner, which may prevent the steam from finding the path upon inflation, but then is released upon deflation of the bladder.

Whether the steam is released during inflation or deflation is not considered a problem for leak detection since the logic used to check the signal can check for a significant change in voltage during either time period. A positive voltage change above the normal background tier level could be detected by the press control system, and the algorithm used can cause the press to pause and signal for a bladder change.

While the invention has been specifically illustrated and described, those skilled in the art will recognize that the invention can be variously modified and practiced without departing from the spirit of the invention. The invention is limited only by the scope of the following claims.

What is claimed is:

1. A method for detecting leaks in a steam activated expansion vessel used in industrial equipment comprising the steps of:

(a) creating or selecting a path in the industrial equipment through which steam would travel if escaping from the steam activated expansion vessel, and (b) placing a absolute humidity sensor in said path to detect escaping steam.

2. The method of claim 1 comprising the further step of selecting a humidity sensor that has the ability to detect moisture at 25° C. to 200° C.

3. The method of claim 1 comprising the further step of selecting an absolute humidity sensor that has the ability to detect moisture at 25° C. to 200° C.

4. The method of claim 1 comprising the step of using data from each activation cycle to establish a baseline or background for atmospheric humidity.

5. The method of claim 1 comprising the further step of providing computer control for said industrial equipment such that when a leak is detected an alarm is sounded and said industrial equipment is automatically shut down.

6. The method of claim 1 comprising the further step of placing a filter in said path between said steam activated expansion vessel and said sensor, said filter being pervious to water vapor.

7. The method of claim 3 wherein the industrial equipment is a curing mold for a pneumatic tire and the path is a bolster screw in an area of the mold in the proximity of a bead area of a tire which is being cured in the mold.

8. The method of claim 7 comprising the further step of placing said absolute humidity sensor in a mold in a bolster screw in the proximity of a curing bladder center post.

9. The method of claim 7 in which the mold is a two piece mold and the method comprises the further step of placing said sensor in an upper segment of the mold.

10. An apparatus for curing an flexible article, said apparatus comprising (a) a shaping means for shaping the article during curing, (b) an expansion vessel within said shaping means, said expansion vessel having the capacity to withstand elevated temperatures and high pressures, said expansion vessel being inflated with steam and being used to push the article into said shaping means, and (c) an absolute humidity sensor located in the proximity of said expansion vessel and said shaping means for detecting escaping steam from said expansion vessel.

11. The apparatus of claim 10 which comprises a curing mold for a pneumatic tire, and the absolute humidity sensor has the ability to detect moisture at 25° C. to 200° C.

12. The apparatus of claim 10 wherein the absolute humidity sensor has two matched thermistor elements, one being hermetically glass encapsulated in dry nitrogen and the other exposed to the environment.

13. The apparatus of claim 11 which comprises a two-piece tire mold.

14. The apparatus of claim 11 which further comprises a magnet attached to said curing mold, said absolute humidity sensor being attached to said magnet, whereby said absolute humidity sensor is held in place by said magnet.

15. The apparatus of claim 10 which further comprises data retention and data processing and data display means associated with said absolute humidity sensor.

16. The apparatus of claim 11 which further comprises a bolster screw in said mold in proximity to a bead of a tire which is cured in said mold, and said absolute humidity sensor is placed in said bolster screw.

17. The apparatus of claim 10 which further comprises a filter placed between said expansion vessel and said absolute humidity sensor, said filter having the capacity to permit passage of water vapor while trapping most other gases.

18. The apparatus of claim 10 comprising a barrier surrounding said expansion vessel, said barrier providing at least a portion of a path to said absolute humidity sensor.

19. The apparatus of claim 10 wherein said absolute humidity sensor is encased in a portion of said shaping means.

20. The apparatus of claim 10, wherein the expansion vessel comprises a flexible curing bladder.

* * * * *